United States Patent [19]

Enomoto et al.

[11] 4,445,757
[45] May 1, 1984

[54] ZOOMING DEVICE

[75] Inventors: Shigeo Enomoto; Hitoshi Hirobe; Shinji Urata, all of Tokyo, Japan

[73] Assignee: Asahi Kogaku Kogyo Kabushiki Kaisha, Tokyo, Japan

[21] Appl. No.: 422,443

[22] Filed: Sep. 23, 1982

[30] Foreign Application Priority Data

Nov. 19, 1981 [JP] Japan ................... 56-171400

[51] Int. Cl.³ .................................. G02B 7/11
[52] U.S. Cl. ...................... 350/429; 354/195.12
[58] Field of Search ............... 350/429, 255; 354/197

[56] References Cited

U.S. PATENT DOCUMENTS 3,209,367 9/1962 Heden ................. 354/197
3,418,032 12/1968 Kajiro ................. 350/429

*Primary Examiner*—John K. Corbin
*Assistant Examiner*—Paul Dzierzynski
*Attorney, Agent, or Firm*—Browdy and Neimark

[57] ABSTRACT

A zooming device for a camera, which comprises a rocker which operates a plurality of successively operable switches provided on each side of the center of rotation. The rocker can be turned in either direction to operate the first one of the plurality of switches so as to obtain zooming by a corresponding multiple lens group in the corresponding direction and at a predetermined speed. The zooming speed can be changed to a next speed when a second one of the switches is operated by further turning of the rocker.

4 Claims, 4 Drawing Figures

ZOOMING DEVICE

FIELD OF THE INVENTION

The present invention relates to zooming devices and, more particularly, to a zooming device which incorporates a switch for shifting the direction and speed of the zoom by means of a multiplying lens group of a zooming lens.

BACKGROUND OF THE INVENTION

Prior art zooming devices of this type often include a switch commonly termed a zooming switch, which determines the shortening or lengthening of the focal distance according to the direction of zooming by means of a multiplying lens group. Such prior art devices also often include a second switch called a zooming speed switch for shifting the zooming speed.

One disadvantage of this known arrangement, however, when such zooming devices are used in a portable television camera or the like, is that an inconvenience is experienced when the camera is supported by both hands of the operator, in which case, his use of his fingers is restricted. More particularly, in a case when operating the zooming switch and then operating the zooming speed switch by changing the finger position while holding the camera, a deviation of the photographing angle or disturbance of the image is liable to result. Specifically when the object moves quickly, in which case, quick zooming operations are required, it is difficult to achieve camera stability.

SUMMARY OF THE INVENTION

Accordingly, it is an object of the present invention to eliminate these problems of the prior art.

It is still another object of the present invention to provide a zooming device in which the direction and speed of zooming by means of a multiplying group can be achieved in a single operation.

It is still another object of the present invention to provide a zooming device of such an arrangement, that will employ the use of a single "seesaw" or rocker type switch.

These and other objects of the present invention will be better understood with reference to the following description of typical embodiments of the present invention as illustrated in the accompanying drawings.

BRIEF DESCRIPTION OF THE DRAWINGS

In the accompanying drawings in which the same reference numerals designate the same parts in all views:

FIGS. 3A and 3B are fragmentary side views illustrating the operation of the seesaw switch in which FIG. 3A shows the case when the right side first switch is operated and FIG. 3B shows the case when the right side second switch is operated.

DETAILED DESCRIPTION OF PREFERRED EMBODIMENTS

Figure 1:
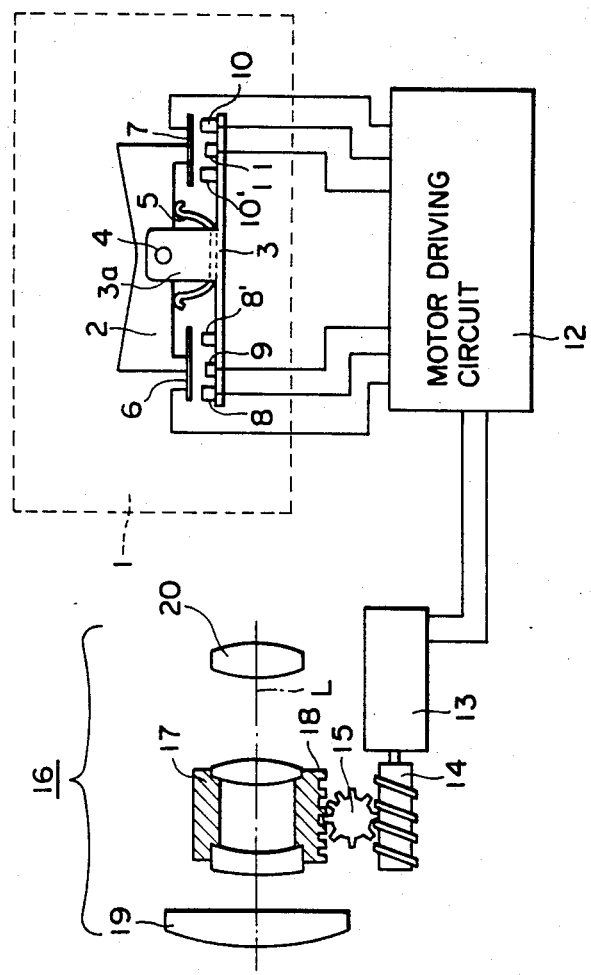
FIG. 1 is a schematic representation of one embodiment according to the present invention.

Referring now more particularly to the drawings, one of the preferred embodiments of a zooming device according to the present invention may be seen in FIG. 1 as comprising rocker switch 1, which is operated by and is included in rocker lever 2, which is rockably mounted on a shaft 4 which is secured in bracket portions 3a or a base 3. "Seesaw" lever 2 is supported on the opposite ends of a substantially U-shaped spring 5 which is mounted on the base 3, and includes movable contacts consisting of spring members that are secured to the opposite ends of the lever 2. Spring 5 thus normally biases rocker lever 2 to a neutral position as shown in FIG. 1. A movable contact 6 faces and co-operates with fixed contacts 8 and 9 which are attached to the base 3 on one side thereof, while a similar movable contact 7 faces and co-operates with fixed contacts 10 and 11 secured to the base 3 on the other side thereof. Auxiliary fixed contacts at 8' and 10' are further secured to the base 3 and are the same effective height or level above base 3, which common level is higher than the level of the fixed contacts 9 and 11, respectively.

Movable contacts 6 and 7 form first switches with the respective fixed contacts 8 and 10 and also form second switches with the respective fixed contacts 9 and 10.

Motor driving circuit 12 for driving a motor 13 is connected to movable contacts 6 and 7 and also to fixed contacts 8, 9, 10 and 11. The motor 13 is coupled to a worm 14, which is in turn coupled to a worm gear 15, which is in mesh with a rack gear 18 secured to a multiple lens group 17 constituting part of a zoom lens 16. The zoom lens 16 includes front and rear lens groups 19 and 20, which are coaxial on an optical axis L and are disposed on the front and rear sides respectively of the multiple lens group 17.

Figure 2:
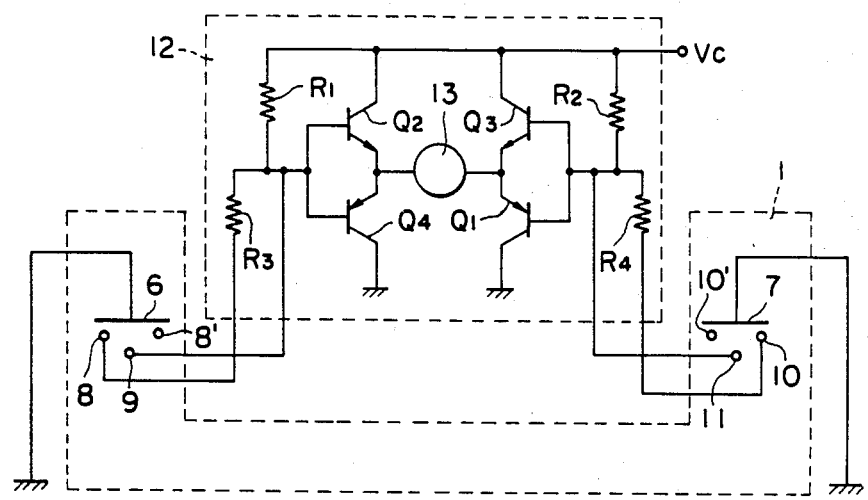
FIG. 2 is a circuit diagram showing a rocker switch and a motor driving circuit according to the present invention.

Referring now more particularly to FIG. 2, the motor driving circuit 12, includes four transistors $Q_1$, $Q_2$, $Q_3$, and $Q_4$, for driving the motor 13. Transistors $Q_1$ and $Q_4$ may be PNP transistors while the transistors $Q_2$ and $Q_3$ are NPN transistors. Transistors $Q_1$ and $Q_4$ have their collectors grounded, while transistors $Q_1$ and $Q_3$ have their emitters connected to each other, and the junction is connected to one of the terminals of the motor 13. Transistors $Q_1$ and $Q_3$ are connected to each other, whereas $Q_3$ has its collector connected to a voltage source Vc. Transistors $Q_2$ and $Q_4$ have their emitters connected to each other, and the junction is joined to the other terminal of the motor 13. Transistors $Q_2$ and $Q_4$ also have their collectors joined to each other and transistors $Q_2$ has its collector connected to the voltage source Vc. A resistor $R_1$ is connected between the collector and base of the transistor $Q_2$, and a resistor $R_2$ is attached between the collector and base of the transistor $Q_3$.

The movable contacts 6 and 7 of the rocker or "seesaw" of rocker switch 1 are grounded. Fixed contact 9 is joined to the base of the transistor $Q_4$ and fixed contact 8 is attached to the base of the transistor $Q_4$ through a resistor $R_3$. The fixed contact 11 is in communication with the base of the transistor $Q_1$, while fixed contact 10 is joined to the base of the transistor $Q_1$ through a resistor $R_4$.

METHOD OF OPERATION

Figure 3:
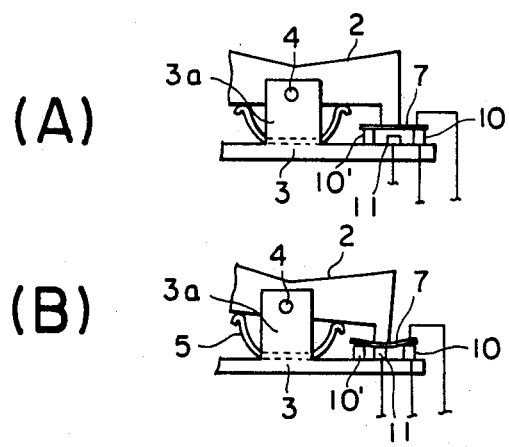

When the "seesaw" lever 2 is in its center position as shown in FIG. 1, the movable contacts 6 and 7 are in communication with none of the fixed contacts 8, 9, 10 and 11 and auxiliary fixed contacts 8' and 10'. When the lever 2 is rocked in either direction, zooming to shorten or lengthen the focal distance can be obtained. In a case when it is necessary to effect low speed zooming in the shortening of focal distance direction, the seesaw lever 2 is rocked in the clockwise direction. As a result, the movable contact 7 is brought into contact with the fixed contact 10 and auxiliary fixed contact 10'. With the closure of this switch, a voltage of Vc·R$_4$/(R$_2$+R$_4$) is applied to the base of the transistor Q$_1$ to cause current from the transistor Q$_1$ to travel through the motor 13 to the transistor Q$_2$. At this time, the terminal voltage developed across the motor 13 is substantially Vc·R$_4$/(R$_2$+R$_4$). When subsequently, it becomes necessary to effect high speed zooming in the shortening of focal distance direction, the seesaw lever 2 is further moved clockwise. As a result, the movable contact 7 is bent (see FIG. 3B) until a portion is in contact with the fixed contact 11. With the closure of this switch, the base potential on the transistor Q$_1$ is reduced to ground or zero, while terminal voltage across the motor 13 is increased to be substantially equal to Vc.

For zooming operations in the lengthening focal distance directions, the seesaw lever 2 is turned in the counterclockwise direction. As a result, the movable contact 6 is brought into communication with the fixed contact 8 and auxiliary fixed contact 8'. With the closure of this switch, current is caused to flow from the transistor Q$_3$ through the motor 13 to the transistor Q$_4$. The voltage developed across the motor 13, in this case, is substantially Vc·R$_1$(R$_1$+R$_3$) in absolute value and opposite in sense to that in the previous case when the seesaw lever 2 was turned in the clockwise direction, i.e., the positive supply and the ground are reversed in the two cases. When the seesaw lever 2 is further turned counterclockwise, the movable contact 6 is brought into communication with the fixed contact 9. Thus, the terminal voltage across the motor 13 is increased to be substantially equal to the Vc.

As mentioned above, the motor 13 thus can be rotated at a low speed or at a high speed in the reverse direction. When the seesaw lever 2 is released after zooming operations, it is restored to its initial center position by the restoring force of the spring 5, while the motor 13 is stopped. The direction of zooming and the direction of rotation of the motor 13 may be suitably related to each other. Further, it should be understood that the seesaw switch is switched in two stages constituted by the fixed contacts 8 and 9 or fixed contacts 10 and 11 in either direction as shown. It is possible in other embodiments to provide three or more stages of switching in either direction.

As has been described, according to the present invention, use is made of a rocker switch, in which a plurality of successively operable switches are provided on each side of the center of rotation and which can be selectively operated in either direction. By operating the first one of the switches on either side, zooming of the corresponding multiple lens group in the corresponding direction and at a predetermined speed can be obtained. Zooming speeds can be changed by operating the second switch by further turning the seesaw switch. Thus, the zooming speed can be changed without changing the operator's finger position. Maneuverability of the operated camera supported by both hands thus can be improved.

Further, the zooming speed can be successively operated from the first low speed toward higher speeds, so that it is possible to prevent malfunction. The speed increase can be in one or more stages.

Furthermore, where spring members are used as the movable contacts of the seesaw switch as in the above embodiment of the present invention a given zooming speed can be reliably selected by the operator by sensing the back pressure that is exerted onto his finger by the spring member, and such an arrangement can be used to make speed changes in stepwise manner.

While the invention has been described in detail above, it is to be understood that this detailed description is by way of example only, and the protection granted is to be limited only within the spirit of the invention and the scope of the following claims.

What is claimed:

1. In combination, a zoom lens comprising a movable portion which controls the focal length of said lens, motor means for driving said movable lens portion to cause said lens to zoom, manually operable means and circuit means for controlling said motor means to cause said lens to zoom either in the focal distance shortening or the focal distance lengthening direction and to cause said zooming in each of said directions to occur at one of at least two predetermined speeds, said manually operable means comprising a rocker member, means to pivotally mount said rocker member at about its center portion for rocking motion to either side of a neutral position of said rocker member on said mounting means, spring means normally biasing said rocker member to said neutral position, said control circuit means comprising at least first and second switch means, said switch means comprising a contact member on each end of said rocker member; and said switch means, said contact member and said control circuit means being so arranged that rocking motion manually applied to said rocker member to one side of said neutral position to cause the corresponding one of said contact members to close a first one of said corresponding first and second switch means will cause said lens to zoom at a first predetermined speed in one of said directions, and continued motion of said rocker member to said one side will close the second one of said switch means to cause zooming of said lens in said one of said directions at a second predetermined speed; and motion of said rocker to the other side of said neutral position will cause similar zooming motions of said lens in the other of said directions.

2. The combination of claim 1, wherein said second predetermined speed is faster than said first predetermined speed.

3. The combination of claim 1 or 2, wherein said control circuit comprises an array of resistors and transistors between a power supply and said lens motor means so arranged that a fraction of the full power supply voltage is applied to said motor to achieve a slower zoom speed when one of said first and second switch means is activated and to supply substantially the full power supply voltage to said motor to achieve a maximum zoom speed when the other of said first and second switch means is activated by said rocker member.

4. A method of controlling the speed and direction of motion of the motor driven movable lens portion of a zoom lens comprises the use of a single manually operated rocker member, biasing said rocker member to a neutral position from which it can be moved in two opposite directions, providing two sets of at least first and second switch means each to be operated by said rocker member when moved in each of said two opposite directions, and providing control circuit means activated by all of said switch means and so arranged between a power supply and the motor driving said movable lens portion that a fraction of the full power supply voltage is applied to said motor to achieve a slower zoom speed when one of said first and second switch means is activated by said rocker member and to supply substantially full power supply voltage to said motor to achieve maximum zoom speed in the same direction when the other of said first and second switch means is activated by said rocker member; and said control circuit means being further so arranged that motion of said rocker to the other side of said neutral position will cause similar zooming motions of said lens in the other of said directions.

* * * * *